(12) United States Patent
Kothari et al.

(10) Patent No.: US 8,878,825 B2
(45) Date of Patent: Nov. 4, 2014

(54) SYSTEM AND METHOD FOR PROVIDING A VARIABLE REFRESH RATE OF AN INTERFEROMETRIC MODULATOR DISPLAY

(75) Inventors: Manish Kothari, Cupertino, CA (US); Clarence Chui, San Mateo, CA (US); Gaurav Sethi, Dublin, CA (US); Jeffrey B. Sampsell, San Jose, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 1033 days.

(21) Appl. No.: 11/178,036

(22) Filed: Jul. 8, 2005

(65) Prior Publication Data

US 2006/0066601 A1    Mar. 30, 2006

Related U.S. Application Data

(60) Provisional application No. 60/613,526, filed on Sep. 27, 2004.

(51) Int. Cl.
 *G09G 5/00*  (2006.01)
 *G02B 26/00* (2006.01)
 *G09G 3/34*  (2006.01)
 *G09G 5/395* (2006.01)

(52) U.S. Cl.
 CPC ...... *G02B 26/001* (2013.01); *G09G 2310/0275* (2013.01); *G09G 3/3466* (2013.01); *G09G 5/395* (2013.01); *G09G 2310/04* (2013.01)
 USPC ........................................................ 345/204

(58) Field of Classification Search
 CPC .............. G09G 3/3618; G09G 3/3629; G09G 2300/0473; G09G 2300/0482; G09G 2300/0814; G09G 2310/04; G09G 2330/021; G09G 2330/022
 USPC ........................ 345/204, 84–85, 87–104, 107
 See application file for complete search history.

(56) References Cited

U.S. PATENT DOCUMENTS 3,982,239 A    9/1976  Sherr
4,403,248 A    9/1983  te Velde
(Continued)

FOREIGN PATENT DOCUMENTS

EP    0295802 A     12/1988
EP    0300754 A2     1/1989
(Continued)

OTHER PUBLICATIONS

International Preliminary Report on Patentability dated Apr. 5, 2007.
(Continued)

*Primary Examiner* — Amr Awad
*Assistant Examiner* — Stephen Bray
(74) *Attorney, Agent, or Firm* — Knobbe, Martens, Olson & Bear, LLP

(57) ABSTRACT

Embodiments includes methods and systems for updating display devices at a variable refresh rate. One embodiment includes a method of updating an image displayed on a display device. The method includes setting an indicator to a first state that indicates that image data has been received subsequent to a previous update of a display device and periodically updating at least a portion of the display device to display the image. The updating is deferred for at least one period when the indicator is in a state other than the first state. In another embodiment, updates of the display are substantially asynchronous and occur as the processor writes data to one or more shift registers. When a shift register is filled, for example, having received data for a row within the display, the data in the shift register is written to the display. Other embodiments include methods of manufacturing such devices.

34 Claims, 11 Drawing Sheets

(56) References Cited

U.S. PATENT DOCUMENTS

| | | | |
|---|---|---|---|
| 4,441,791 A | 4/1984 | Hornbeck | |
| 4,459,182 A | 7/1984 | te Velde | |
| 4,482,213 A | 11/1984 | Piliavin et al. | |
| 4,500,171 A | 2/1985 | Penz et al. | |
| 4,519,676 A | 5/1985 | te Velde | |
| 4,566,935 A | 1/1986 | Hornbeck | |
| 4,571,603 A | 2/1986 | Hornbeck et al. | |
| 4,596,992 A | 6/1986 | Hornbeck | |
| 4,615,595 A | 10/1986 | Hornbeck | |
| 4,655,897 A * | 4/1987 | DiSanto et al. | 359/296 |
| 4,662,746 A | 5/1987 | Hornbeck | |
| 4,681,403 A | 7/1987 | te Velde et al. | |
| 4,709,995 A | 12/1987 | Kuribayashi et al. | |
| 4,710,732 A | 12/1987 | Hornbeck | |
| 4,757,441 A * | 7/1988 | Buckland et al. | 345/503 |
| 4,856,863 A | 8/1989 | Sampsell et al. | |
| 4,859,060 A | 8/1989 | Katagiri et al. | |
| 4,954,789 A | 9/1990 | Sampsell | |
| 4,956,619 A | 9/1990 | Hornbeck | |
| 4,982,184 A | 1/1991 | Kirkwood | |
| 5,018,256 A | 5/1991 | Hornbeck | |
| 5,028,939 A | 7/1991 | Hornbeck et al. | |
| 5,037,173 A | 8/1991 | Sampsell et al. | |
| 5,055,833 A | 10/1991 | Hehlen et al. | |
| 5,061,049 A | 10/1991 | Hornbeck | |
| 5,078,479 A | 1/1992 | Vuilleumier | |
| 5,079,544 A | 1/1992 | DeMond et al. | |
| 5,083,857 A | 1/1992 | Hornbeck | |
| 5,096,279 A | 3/1992 | Hornbeck et al. | |
| 5,099,353 A | 3/1992 | Hornbeck | |
| 5,124,834 A | 6/1992 | Cusano et al. | |
| 5,142,405 A | 8/1992 | Hornbeck | |
| 5,142,414 A | 8/1992 | Koehler et al. | |
| 5,162,787 A | 11/1992 | Thompson et al. | |
| 5,168,406 A | 12/1992 | Nelson | |
| 5,170,156 A | 12/1992 | DeMond et al. | |
| 5,172,262 A | 12/1992 | Hornbeck | |
| 5,179,274 A | 1/1993 | Sampsell | |
| 5,192,395 A | 3/1993 | Boysel et al. | |
| 5,192,946 A | 3/1993 | Thompson et al. | |
| 5,206,629 A | 4/1993 | DeMond et al. | |
| 5,212,582 A | 5/1993 | Nelson | |
| 5,214,419 A | 5/1993 | DeMond et al. | |
| 5,214,420 A | 5/1993 | Thompson et al. | |
| 5,216,537 A | 6/1993 | Hornbeck | |
| 5,222,214 A * | 6/1993 | Kobayashi | 345/530 |
| 5,226,099 A | 7/1993 | Mignardi et al. | |
| 5,227,900 A | 7/1993 | Inaba et al. | |
| 5,231,532 A | 7/1993 | Magel et al. | |
| 5,233,385 A | 8/1993 | Sampsell | |
| 5,233,456 A | 8/1993 | Nelson | |
| 5,233,459 A | 8/1993 | Bozler et al. | |
| 5,254,980 A | 10/1993 | Hendrix et al. | |
| 5,272,473 A | 12/1993 | Thompson et al. | |
| 5,278,652 A | 1/1994 | Urbanus et al. | |
| 5,280,277 A | 1/1994 | Hornbeck | |
| 5,287,096 A | 2/1994 | Thompson et al. | |
| 5,287,215 A | 2/1994 | Warde et al. | |
| 5,296,950 A | 3/1994 | Lin et al. | |
| 5,305,640 A | 4/1994 | Boysel et al. | |
| 5,307,372 A * | 4/1994 | Sawyer et al. | 375/133 |
| 5,312,513 A | 5/1994 | Florence et al. | |
| 5,321,811 A * | 6/1994 | Kato et al. | 345/520 |
| 5,323,002 A | 6/1994 | Sampsell et al. | |
| 5,325,116 A | 6/1994 | Sampsell | |
| 5,327,286 A | 7/1994 | Sampsell et al. | |
| 5,331,454 A | 7/1994 | Hornbeck | |
| 5,339,116 A | 8/1994 | Urbanus et al. | |
| 5,365,283 A | 11/1994 | Doherty et al. | |
| 5,411,769 A | 5/1995 | Hornbeck | |
| 5,444,566 A | 8/1995 | Gale et al. | |
| 5,446,479 A | 8/1995 | Thompson et al. | |
| 5,448,314 A | 9/1995 | Heimbuch et al. | |
| 5,452,024 A | 9/1995 | Sampsell | |
| 5,454,906 A | 10/1995 | Baker et al. | |
| 5,457,493 A | 10/1995 | Leddy et al. | |
| 5,457,566 A | 10/1995 | Sampsell et al. | |
| 5,459,602 A | 10/1995 | Sampsell | |
| 5,461,411 A | 10/1995 | Florence et al. | |
| 5,488,505 A | 1/1996 | Engle | |
| 5,489,952 A | 2/1996 | Gove et al. | |
| 5,497,172 A | 3/1996 | Doherty et al. | |
| 5,497,197 A | 3/1996 | Gove et al. | |
| 5,499,062 A | 3/1996 | Urbanus | |
| 5,506,597 A | 4/1996 | Thompson et al. | |
| 5,515,076 A | 5/1996 | Thompson et al. | |
| 5,517,347 A | 5/1996 | Sampsell | |
| 5,523,803 A | 6/1996 | Urbanus et al. | |
| 5,526,051 A | 6/1996 | Gove et al. | |
| 5,526,172 A | 6/1996 | Kanack | |
| 5,526,688 A | 6/1996 | Boysel et al. | |
| 5,535,047 A | 7/1996 | Hornbeck | |
| 5,548,301 A | 8/1996 | Kornher et al. | |
| 5,551,293 A | 9/1996 | Boysel et al. | |
| 5,552,924 A | 9/1996 | Tregilgas | |
| 5,552,925 A | 9/1996 | Worley | |
| 5,563,398 A | 10/1996 | Sampsell | |
| 5,567,334 A | 10/1996 | Baker et al. | |
| 5,570,135 A | 10/1996 | Gove et al. | |
| 5,578,976 A | 11/1996 | Yao | |
| 5,581,272 A | 12/1996 | Conner et al. | |
| 5,583,688 A | 12/1996 | Hornbeck | |
| 5,589,852 A | 12/1996 | Thompson et al. | |
| 5,597,736 A | 1/1997 | Sampsell | |
| 5,598,565 A | 1/1997 | Reinhardt | |
| 5,600,383 A | 2/1997 | Hornbeck | |
| 5,602,671 A | 2/1997 | Hornbeck | |
| 5,606,441 A | 2/1997 | Florence et al. | |
| 5,608,468 A | 3/1997 | Gove et al. | |
| 5,610,438 A | 3/1997 | Wallace et al. | |
| 5,610,624 A | 3/1997 | Bhuva | |
| 5,610,625 A | 3/1997 | Sampsell | |
| 5,612,713 A | 3/1997 | Bhuva et al. | |
| 5,613,103 A * | 3/1997 | Nobutani et al. | 345/556 |
| 5,619,061 A | 4/1997 | Goldsmith et al. | |
| 5,619,365 A | 4/1997 | Rhoades et al. | |
| 5,619,366 A | 4/1997 | Rhoads et al. | |
| 5,629,790 A | 5/1997 | Neukermans et al. | |
| 5,633,652 A | 5/1997 | Kanbe et al. | |
| 5,636,052 A | 6/1997 | Arney et al. | |
| 5,638,084 A | 6/1997 | Kalt | |
| 5,638,946 A | 6/1997 | Zavracky | |
| 5,646,768 A | 7/1997 | Kaeiyama | |
| 5,650,881 A | 7/1997 | Hornbeck | |
| 5,654,741 A | 8/1997 | Sampsell et al. | |
| 5,657,099 A | 8/1997 | Doherty et al. | |
| 5,659,374 A | 8/1997 | Gale, Jr. et al. | |
| 5,665,997 A | 9/1997 | Weaver et al. | |
| 5,699,075 A | 12/1997 | Miyamoto | |
| 5,745,193 A | 4/1998 | Urbanus et al. | |
| 5,745,281 A | 4/1998 | Yi et al. | |
| 5,754,160 A | 5/1998 | Shimizu et al. | |
| 5,771,116 A | 6/1998 | Miller et al. | |
| 5,784,189 A | 7/1998 | Bozler et al. | |
| 5,784,212 A | 7/1998 | Hornbeck | |
| 5,808,780 A | 9/1998 | McDonald | |
| 5,818,095 A | 10/1998 | Sampsell | |
| 5,835,255 A | 11/1998 | Miles | |
| 5,842,088 A | 11/1998 | Thompson | |
| 5,867,302 A | 2/1999 | Fleming et al. | |
| 5,912,758 A | 6/1999 | Knipe et al. | |
| 5,943,158 A | 8/1999 | Ford et al. | |
| 5,959,763 A | 9/1999 | Bozler et al. | |
| 5,966,235 A | 10/1999 | Walker et al. | |
| 5,986,796 A | 11/1999 | Miles | |
| 6,028,690 A | 2/2000 | Carter et al. | |
| 6,038,056 A | 3/2000 | Florence et al. | |
| 6,040,937 A | 3/2000 | Miles | |
| 6,049,317 A | 4/2000 | Thompson et al. | |
| 6,055,090 A | 4/2000 | Miles | |
| 6,061,075 A | 5/2000 | Nelson et al. | |
| 6,099,132 A | 8/2000 | Kaeriyama | |
| 6,100,872 A | 8/2000 | Aratani et al. | |
| 6,113,239 A | 9/2000 | Sampsell et al. | |

(56) References Cited

U.S. PATENT DOCUMENTS

| | | | |
|---|---|---|---|
| 6,147,790 A | 11/2000 | Meier et al. | |
| 6,151,020 A * | 11/2000 | Palmer et al. | 715/733 |
| 6,160,833 A | 12/2000 | Floyd et al. | |
| 6,180,428 B1 | 1/2001 | Peeters et al. | |
| 6,201,633 B1 | 3/2001 | Peeters et al. | |
| 6,232,936 B1 | 5/2001 | Gove et al. | |
| 6,275,326 B1 | 8/2001 | Bhalla et al. | |
| 6,282,010 B1 | 8/2001 | Sulzbach et al. | |
| 6,295,154 B1 | 9/2001 | Laor et al. | |
| 6,304,297 B1 | 10/2001 | Swan | |
| 6,323,982 B1 | 11/2001 | Hornbeck | |
| 6,327,071 B1 | 12/2001 | Kimura | |
| 6,356,085 B1 | 3/2002 | Ryat et al. | |
| 6,356,254 B1 | 3/2002 | Kimura | |
| 6,429,601 B1 | 8/2002 | Friend et al. | |
| 6,433,917 B1 | 8/2002 | Mei et al. | |
| 6,447,126 B1 | 9/2002 | Hornbeck | |
| 6,465,355 B1 | 10/2002 | Horsley | |
| 6,466,358 B2 | 10/2002 | Tew | |
| 6,473,274 B1 | 10/2002 | Maimone et al. | |
| 6,480,177 B2 | 11/2002 | Doherty et al. | |
| 6,496,122 B2 | 12/2002 | Sampsell | |
| 6,501,107 B1 | 12/2002 | Sinclair et al. | |
| 6,507,330 B1 | 1/2003 | Handschy et al. | |
| 6,507,331 B1 | 1/2003 | Schlangen et al. | |
| 6,545,335 B1 | 4/2003 | Chua et al. | |
| 6,548,908 B2 | 4/2003 | Chua et al. | |
| 6,549,338 B1 | 4/2003 | Wolverton et al. | |
| 6,552,840 B2 | 4/2003 | Knipe | |
| 6,574,033 B1 | 6/2003 | Chui et al. | |
| 6,589,625 B1 | 7/2003 | Kothari et al. | |
| 6,593,934 B1 | 7/2003 | Liaw et al. | |
| 6,600,201 B2 | 7/2003 | Hartwell et al. | |
| 6,606,175 B1 | 8/2003 | Sampsell et al. | |
| 6,625,047 B2 | 9/2003 | Coleman, Jr. | |
| 6,630,786 B2 | 10/2003 | Cummings et al. | |
| 6,632,698 B2 | 10/2003 | Ives | |
| 6,643,069 B2 | 11/2003 | Dewald | |
| 6,650,455 B2 | 11/2003 | Miles | |
| 6,666,561 B1 | 12/2003 | Blakley | |
| 6,674,090 B1 | 1/2004 | Chua et al. | |
| 6,674,562 B1 | 1/2004 | Miles | |
| 6,680,792 B2 | 1/2004 | Miles | |
| 6,710,908 B2 | 3/2004 | Miles et al. | |
| 6,741,377 B2 | 5/2004 | Miles | |
| 6,741,384 B1 | 5/2004 | Martin et al. | |
| 6,741,503 B1 | 5/2004 | Farris et al. | |
| 6,747,785 B2 | 6/2004 | Chen et al. | |
| 6,762,873 B1 | 7/2004 | Coker et al. | |
| 6,775,174 B2 | 8/2004 | Huffman et al. | |
| 6,778,155 B2 | 8/2004 | Doherty et al. | |
| 6,781,643 B1 | 8/2004 | Watanabe et al. | |
| 6,787,384 B2 | 9/2004 | Okumura | |
| 6,787,438 B1 | 9/2004 | Nelson | |
| 6,788,520 B1 | 9/2004 | Behin et al. | |
| 6,794,119 B2 | 9/2004 | Miles | |
| 6,811,267 B1 | 11/2004 | Allen et al. | |
| 6,813,060 B1 | 11/2004 | Garcia et al. | |
| 6,819,469 B1 | 11/2004 | Koba | |
| 6,822,628 B2 | 11/2004 | Dunphy et al. | |
| 6,829,132 B2 | 12/2004 | Martin et al. | |
| 6,853,129 B1 | 2/2005 | Cummings et al. | |
| 6,855,610 B2 | 2/2005 | Tung et al. | |
| 6,859,218 B1 | 2/2005 | Luman et al. | |
| 6,861,277 B1 | 3/2005 | Monroe et al. | |
| 6,862,022 B2 | 3/2005 | Slupe | |
| 6,862,029 B1 | 3/2005 | D'Souza et al. | |
| 6,867,896 B2 | 3/2005 | Miles | |
| 6,870,581 B2 | 3/2005 | Li et al. | |
| 6,892,359 B1 * | 5/2005 | Nason et al. | 715/788 |
| 6,903,860 B2 | 6/2005 | Ishii | |
| 7,123,216 B1 | 10/2006 | Miles | |
| 7,123,246 B2 | 10/2006 | Nakatani et al. | |
| 7,161,728 B2 | 1/2007 | Sampsell et al. | |
| 7,225,249 B1 * | 5/2007 | Barry et al. | 709/227 |
| 7,460,509 B2 * | 12/2008 | Klein et al. | 370/338 |
| 7,558,901 B2 * | 7/2009 | Choi | 710/310 |
| 2001/0003487 A1 | 6/2001 | Miles | |
| 2001/0034075 A1 | 10/2001 | Onoya | |
| 2001/0043171 A1 | 11/2001 | Van Gorkom et al. | |
| 2001/0043205 A1 * | 11/2001 | Huang et al. | 345/204 |
| 2001/0046081 A1 | 11/2001 | Hayashi et al. | |
| 2001/0051014 A1 | 12/2001 | Behin et al. | |
| 2001/0052887 A1 | 12/2001 | Tsutsui et al. | |
| 2002/0000959 A1 | 1/2002 | Colgan et al. | |
| 2002/0000990 A1 * | 1/2002 | Schauser | 345/504 |
| 2002/0005827 A1 | 1/2002 | Kobayashi | |
| 2002/0012159 A1 | 1/2002 | Tew | |
| 2002/0015104 A1 | 2/2002 | Itoh et al. | |
| 2002/0015215 A1 | 2/2002 | Miles | |
| 2002/0024711 A1 | 2/2002 | Miles | |
| 2002/0036304 A1 | 3/2002 | Ehmke et al. | |
| 2002/0050882 A1 | 5/2002 | Hyman et al. | |
| 2002/0054424 A1 | 5/2002 | Miles et al. | |
| 2002/0075226 A1 | 6/2002 | Lippincott | |
| 2002/0075297 A1 * | 6/2002 | Boulter | 345/736 |
| 2002/0075555 A1 | 6/2002 | Miles | |
| 2002/0093722 A1 | 7/2002 | Chan et al. | |
| 2002/0097133 A1 | 7/2002 | Charvet et al. | |
| 2002/0126364 A1 | 9/2002 | Miles | |
| 2002/0179421 A1 | 12/2002 | Williams et al. | |
| 2002/0186108 A1 | 12/2002 | Hallbjorner | |
| 2002/0190940 A1 | 12/2002 | Itoh et al. | |
| 2003/0004272 A1 | 1/2003 | Power | |
| 2003/0025686 A1 * | 2/2003 | Lee et al. | 345/204 |
| 2003/0043157 A1 | 3/2003 | Miles | |
| 2003/0072070 A1 | 4/2003 | Miles | |
| 2003/0122773 A1 | 7/2003 | Washio et al. | |
| 2003/0137215 A1 | 7/2003 | Cabuz | |
| 2003/0137521 A1 | 7/2003 | Zehner et al. | |
| 2003/0189536 A1 | 10/2003 | Ruigt | |
| 2003/0202264 A1 | 10/2003 | Weber et al. | |
| 2003/0202265 A1 | 10/2003 | Reboa et al. | |
| 2003/0202266 A1 | 10/2003 | Ring et al. | |
| 2004/0008396 A1 | 1/2004 | Stappaerts | |
| 2004/0022044 A1 | 2/2004 | Yasuoka et al. | |
| 2004/0027701 A1 | 2/2004 | Ishikawa | |
| 2004/0030844 A1 * | 2/2004 | Tojima et al. | 711/148 |
| 2004/0051929 A1 | 3/2004 | Sampsell et al. | |
| 2004/0058532 A1 | 3/2004 | Miles et al. | |
| 2004/0080807 A1 | 4/2004 | Chen et al. | |
| 2004/0145049 A1 | 7/2004 | McKinnell et al. | |
| 2004/0147056 A1 | 7/2004 | McKinnell et al. | |
| 2004/0160143 A1 | 8/2004 | Shreeve et al. | |
| 2004/0174583 A1 | 9/2004 | Chen et al. | |
| 2004/0179281 A1 | 9/2004 | Reboa | |
| 2004/0212026 A1 | 10/2004 | Van Brocklin et al. | |
| 2004/0217378 A1 | 11/2004 | Martin et al. | |
| 2004/0217919 A1 | 11/2004 | Piehl et al. | |
| 2004/0218251 A1 | 11/2004 | Piehl et al. | |
| 2004/0218334 A1 | 11/2004 | Martin et al. | |
| 2004/0218341 A1 | 11/2004 | Martin et al. | |
| 2004/0223204 A1 | 11/2004 | Mao et al. | |
| 2004/0227493 A1 | 11/2004 | Van Brocklin et al. | |
| 2004/0240032 A1 | 12/2004 | Miles | |
| 2004/0240138 A1 | 12/2004 | Martin et al. | |
| 2004/0245588 A1 | 12/2004 | Nikkel et al. | |
| 2004/0263944 A1 | 12/2004 | Miles et al. | |
| 2005/0001797 A1 | 1/2005 | Miller et al. | |
| 2005/0001828 A1 | 1/2005 | Martin et al. | |
| 2005/0012577 A1 | 1/2005 | Pillans et al. | |
| 2005/0038950 A1 | 2/2005 | Adelmann | |
| 2005/0057442 A1 | 3/2005 | Way | |
| 2005/0068583 A1 | 3/2005 | Gutkowski et al. | |
| 2005/0069209 A1 | 3/2005 | Damera-Venkata et al. | |
| 2005/0116924 A1 | 6/2005 | Sauvante et al. | |
| 2005/0206991 A1 | 9/2005 | Chui et al. | |
| 2005/0286113 A1 | 12/2005 | Miles | |
| 2005/0286114 A1 | 12/2005 | Miles | |
| 2006/0017684 A1 | 1/2006 | Fish | |
| 2006/0020878 A1 * | 1/2006 | Bystricky | 715/500 |
| 2006/0044246 A1 | 3/2006 | Mignard | |
| 2006/0044298 A1 | 3/2006 | Mignard et al. | |
| 2006/0044928 A1 | 3/2006 | Chui et al. | |

(56) References Cited

U.S. PATENT DOCUMENTS

| | | |
|---|---|---|
| 2006/0056000 A1 | 3/2006 | Mignard |
| 2006/0057754 A1 | 3/2006 | Cummings |
| 2006/0066542 A1 | 3/2006 | Chui |
| 2006/0066559 A1 | 3/2006 | Chui et al. |
| 2006/0066560 A1 | 3/2006 | Gally et al. |
| 2006/0066561 A1 | 3/2006 | Chui et al. |
| 2006/0066594 A1 | 3/2006 | Tyger |
| 2006/0066597 A1 | 3/2006 | Sampsell |
| 2006/0066598 A1 | 3/2006 | Floyd |
| 2006/0066937 A1 | 3/2006 | Chui |
| 2006/0066938 A1 | 3/2006 | Chui |
| 2006/0067648 A1 | 3/2006 | Chui et al. |
| 2006/0067653 A1 | 3/2006 | Gally et al. |
| 2006/0077127 A1 | 4/2006 | Sampsell et al. |
| 2006/0077505 A1 | 4/2006 | Chui et al. |
| 2006/0077520 A1 | 4/2006 | Chui et al. |
| 2006/0103613 A1 | 5/2006 | Chui |
| 2006/0284814 A1* | 12/2006 | Ng .................. 345/98 |
| 2009/0122036 A1 | 5/2009 | Miles |
| 2010/0245980 A1 | 9/2010 | Miles |
| 2011/0037907 A1 | 2/2011 | Miles |

FOREIGN PATENT DOCUMENTS

| | | |
|---|---|---|
| EP | 0306308 A2 | 3/1989 |
| EP | 0318050 A | 5/1989 |
| EP | 0 417 523 A | 3/1991 |
| EP | 0 467 048 A | 1/1992 |
| EP | 0 583 102 A1 | 7/1993 |
| EP | 0570906 A | 11/1993 |
| EP | 0608056 A1 | 7/1994 |
| EP | 0655725 A1 | 5/1995 |
| EP | 0 667 548 A1 | 8/1995 |
| EP | 0725380 A1 | 8/1996 |
| EP | 0852371 A1 | 7/1998 |
| EP | 0911794 A1 | 4/1999 |
| EP | 1 017 038 A | 7/2000 |
| EP | 1 146 533 A | 10/2001 |
| EP | 1 239 448 | 9/2002 |
| EP | 1 280 129 | 1/2003 |
| EP | 1343190 A | 9/2003 |
| EP | 1345197 A | 9/2003 |
| EP | 1381023 A | 1/2004 |
| EP | 1473691 A2 | 11/2004 |
| GB | 2401200 A | 11/2004 |
| JP | 2004-29571 | 1/2004 |
| TW | 384410 B | 3/2000 |
| TW | 561293 B | 11/2003 |
| WO | WO 95/30924 | 11/1995 |
| WO | WO 96/10889 | 4/1996 |
| WO | WO 97/17628 | 5/1997 |
| WO | WO 99/52006 A3 | 10/1999 |
| WO | WO 00/25169 | 5/2000 |
| WO | WO 01/73937 A | 10/2001 |
| WO | WO 03/007049 A1 | 1/2003 |
| WO | WO 03/015071 A2 | 2/2003 |
| WO | WO 03/044765 A2 | 5/2003 |
| WO | WO 03/060940 A | 7/2003 |
| WO | WO 03/069413 A1 | 8/2003 |
| WO | WO 03/073151 A1 | 9/2003 |
| WO | WO 03/079323 A | 9/2003 |
| WO | WO 03/090199 A1 | 10/2003 |
| WO | WO 2004/006003 A1 | 1/2004 |
| WO | WO 2004/026757 A2 | 4/2004 |
| WO | WO 2004/049034 A1 | 6/2004 |
| WO | WO 2004/066254 | 8/2004 |
| WO | WO 2004/066256 | 8/2004 |

OTHER PUBLICATIONS

Bains, "Digital Paper Display Technology holds Promise for Portables", CommsDesign EE Times (2000).

Lieberman, "MEMS Display Looks to give PDAs Sharper Image" EE Times (2004).

Lieberman, "Microbridges at heart of new MEMS displays" EE Times (2004).

Seeger et al., "Stabilization of Electrostatically Actuated Mechanical Devices", (1997) International Conference on Solid State Sensors and Actuators; vol. 2, pp. 1133-1136.

Peroulis et al., Low contact resistance series MEMS switches, 2002, pp. 223-226, vol. 1, IEEE MTT-S International Microwave Symposium Digest, New York, NY.

Miles, MEMS-based interferometric modulator for display applications, Part of the SPIE Conference on Micromachined Devices and Components, vol. 3876, pp. 20-28 (1999).

Miles et al., 5.3: Digital Paper™: Reflective displays using interferometric modulation, SID Digest, vol. XXXI, 2000 pp. 32-35.

Substantive Examination Report dated Aug. 25, 2009 in Malaysian App. No. 20054445.

Official Communication dated Aug. 27, 2007 in European App. No. 05796711.9.

Summons to Attend Oral Proceedings dated Jul. 22, 2011 in European App. No. 05796711.9.

Notice to Submit a Response dated Feb. 29, 2012 in Korean App. No. 10-2007-7005413.

Final Office Action dated Sep. 21, 2012 in Korean App. No. 10-2007-7005413.

Office Action dated Dec. 18, 2012 in Taiwanese patent application No. 094133409.

Taiwan Search Report—TW094133409—TIPO—Dec. 1, 2012.

* cited by examiner

SYSTEM AND METHOD FOR PROVIDING A VARIABLE REFRESH RATE OF AN INTERFEROMETRIC MODULATOR DISPLAY

CROSS-REFERENCE TO RELATED APPLICATIONS

This application claims the benefit of, and incorporates by reference in its entirety, U.S. Provisional Application No. 60/613,526 filed Sep. 27, 2004.

BACKGROUND

1. Field

The field of the invention relates to microelectromechanical systems (MEMS).

2. Background

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages that include, for example, reduced power consumption of a display by reducing the refresh rate of the display.

One embodiment includes a method of updating an image displayed on a display device. The method includes receiving image data. The method further includes setting an indicator to a first state that indicates that the image data has been received subsequent to a previous update of a display device. The method further includes periodically updating at least a portion of the display device to display the image. The updating is deferred for at least one period when the indicator is in a state other than the first state.

Another embodiment includes a device for driving a bistable display device. The device includes a frame buffer configured to receive data indicative of an image. The device further includes an output circuit configured to generate a signal for updating a display device to display the image. The device further includes a memory operably connected to the frame buffer and configured to indicate whether the frame buffer has received data subsequent to updating of the display. The device further includes a controller configured to control, based on a content of the memory, when the output circuit generates the signal.

Another embodiment includes an electronic device. The devices includes a display device. The device further includes a frame buffer configured to receive image data. The device further includes a driver circuit configured to periodically generate a signal for updating the display device to display the image data. The device further includes a memory operably connected to the frame buffer and configured to indicate whether the frame buffer has received data subsequent to updating of the display. The circuit is configured to generate the signal only when the memory indicates whether the frame buffer has received data subsequent to updating of the display.

Another embodiment includes a method of making a device for driving a bistable display device. The method includes forming a frame buffer configured to receive data indicative of an image. The method further includes forming an output circuit configured to generate a signal for updating a display device to display the image. The method further includes forming a memory operably connected to the frame buffer and configured to indicate whether the frame buffer has received data subsequent to updating of the display. The method further includes forming a controller configured to control, based on a content of the memory, when the output circuit generates the signal. The method further includes electrically connecting the frame buffer to each of the memory and the output circuit. The method further includes electrically connecting the controller to each of the memory and the output circuit.

Another embodiment includes a device for driving a bistable display device. The device includes means for receiving and storing data indicative of an image, means for generating a signal for updating a display device to display the image, means for indicating whether the means for receiving and storing has received data subsequent to updating of the display, and means for controlling, based on a content of the memory, when the means for generating generates the signal.

Another embodiment includes a device for asynchronously driving a bistable display device. The device includes a circuit configured to asynchronously receive a line of data indicative of a portion of an image. The device further includes an output circuit configured to update a display device to display the portion of the image. The circuit is configured to provide the line of data to the output circuit upon receiving the line of data.

Another embodiment includes a device for asynchronously driving a bistable display device. The device includes means for asynchronously receiving a line of data indicative of a portion of an image; and means for generating a signal to update a display device to display the portion of the image. The means for asynchronously receiving comprises means for providing the line of data to the means for generating upon receiving the line of data.

Another embodiment includes a method of manufacturing a device for asynchronously driving a bistable display device. The method includes forming a circuit configured to asynchronously receive a line of data indicative of a portion of an image. The method further includes forming an output circuit configured to update a display device to display the portion of the image. The method further includes electrically connecting the circuit to the output circuit. The circuit is configured to provide the line of data to the output circuit upon receiving the line of data.

DETAILED DESCRIPTION OF PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Embodiments include systems and methods of updating a display at a rate that is related to the rate that data is written to the display, rather than at a, generally higher, rate that is not directly related to the rate that data is written to the display. For example, in one embodiment, a flag memory is configured to indicate whether a display frame buffer has received new data subsequent to the last update of the display. In one such embodiment, a controller polls a flag memory at a specified rate to determine whether to defer updating of the display (or a portion of the display) because the frame buffer has not received new data since the last update to the display. In another embodiment, updates of the display are substantially asynchronous and occur as the processor writes data to one or more shift registers. When a shift register is filled, for example, having received data for a row within the display, the data in the shift register is written to the display.

Figure 1:
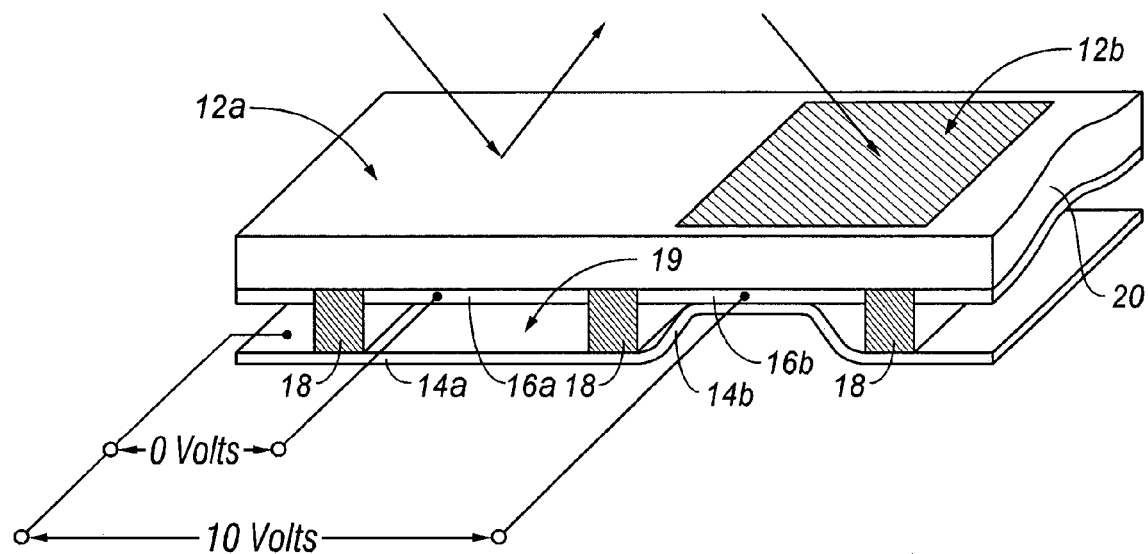
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
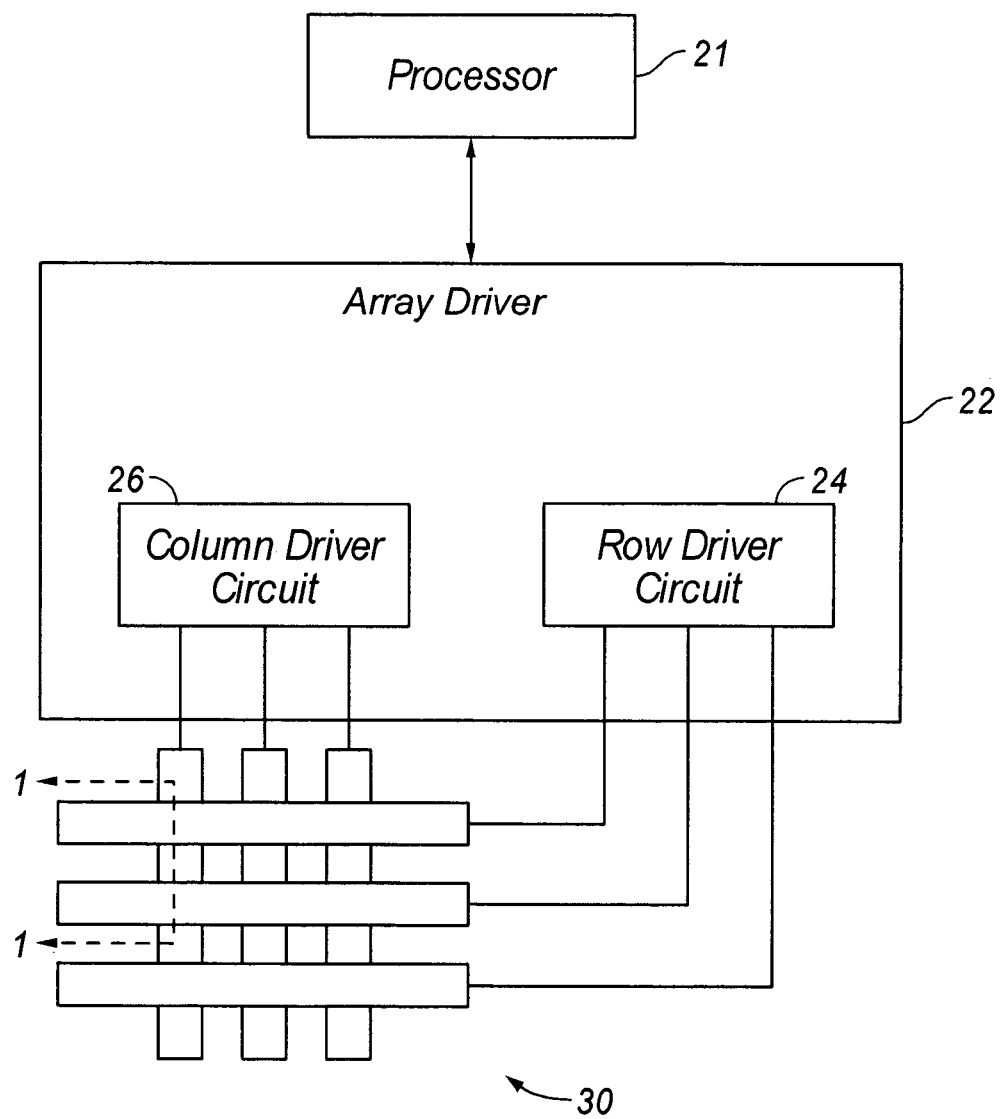
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
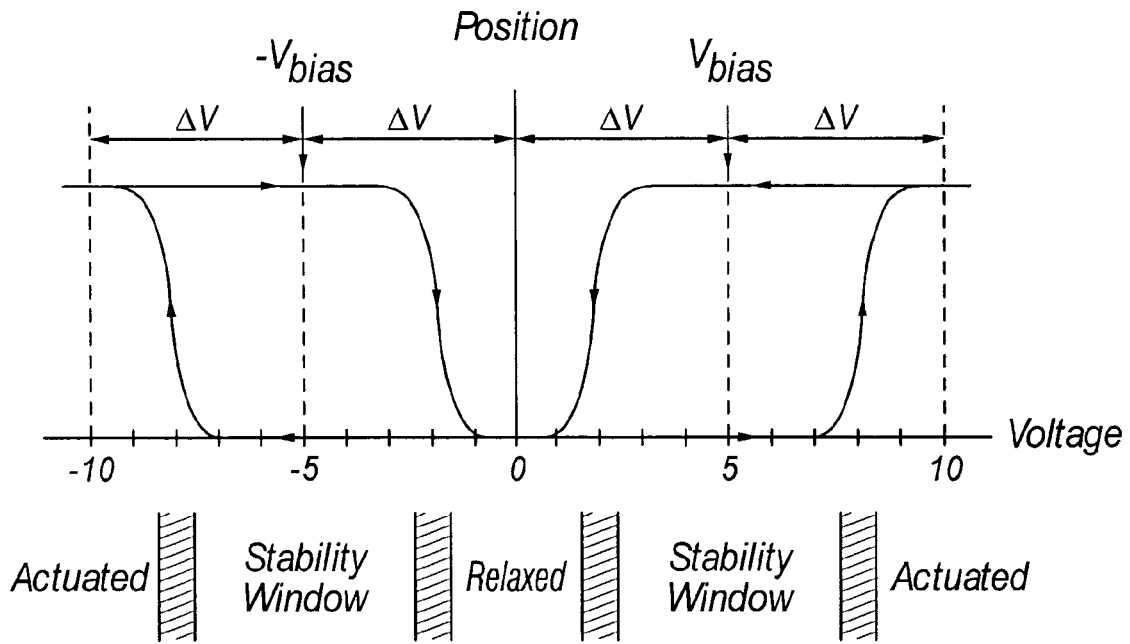
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
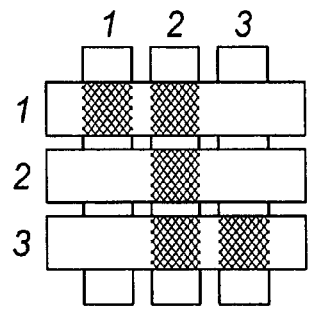
FIGS. 5A and 5B illustrate one exemplary timing diagram for row and column signals that may be used to write a frame of display data to the 3×3 interferometric modulator display of FIG. 2.
Figure 5B:
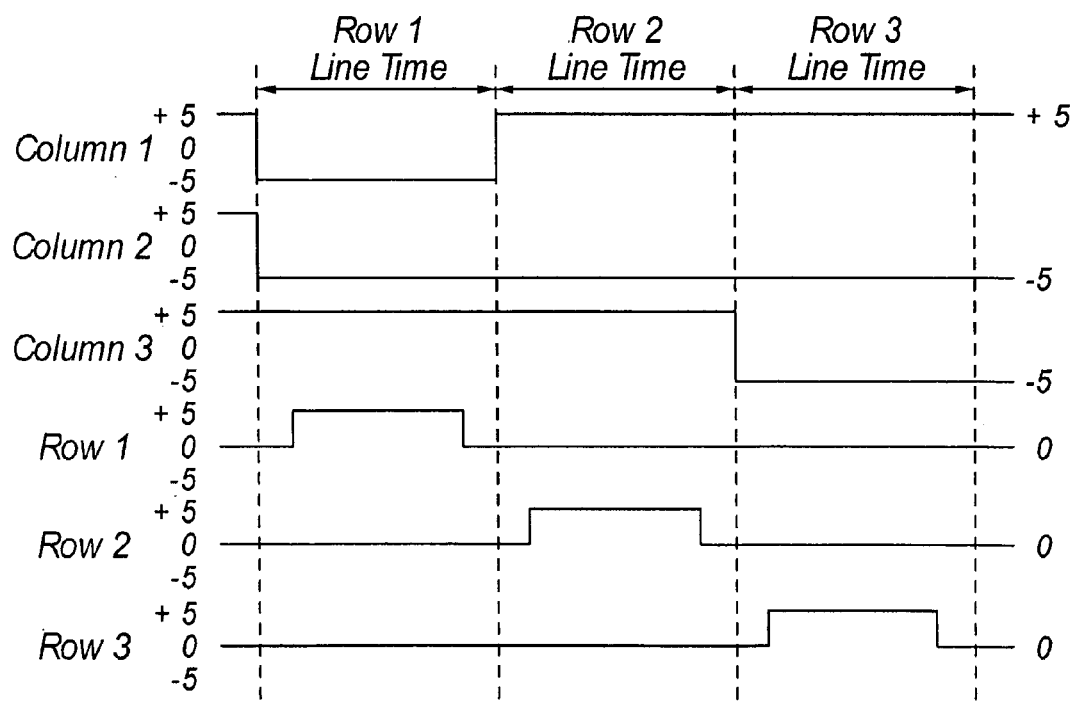

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
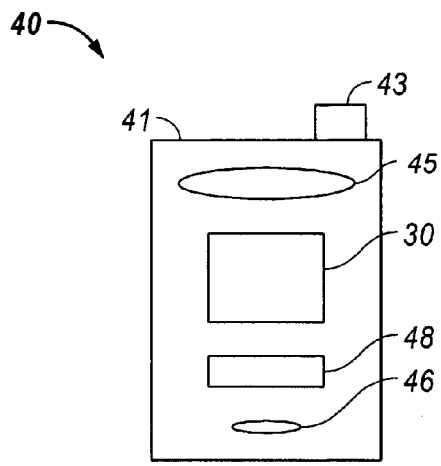
FIGS. 6A and 6B are system block diagrams illustrating an embodiment of a visual display device comprising a plurality of interferometric modulators.
Figure 6B:
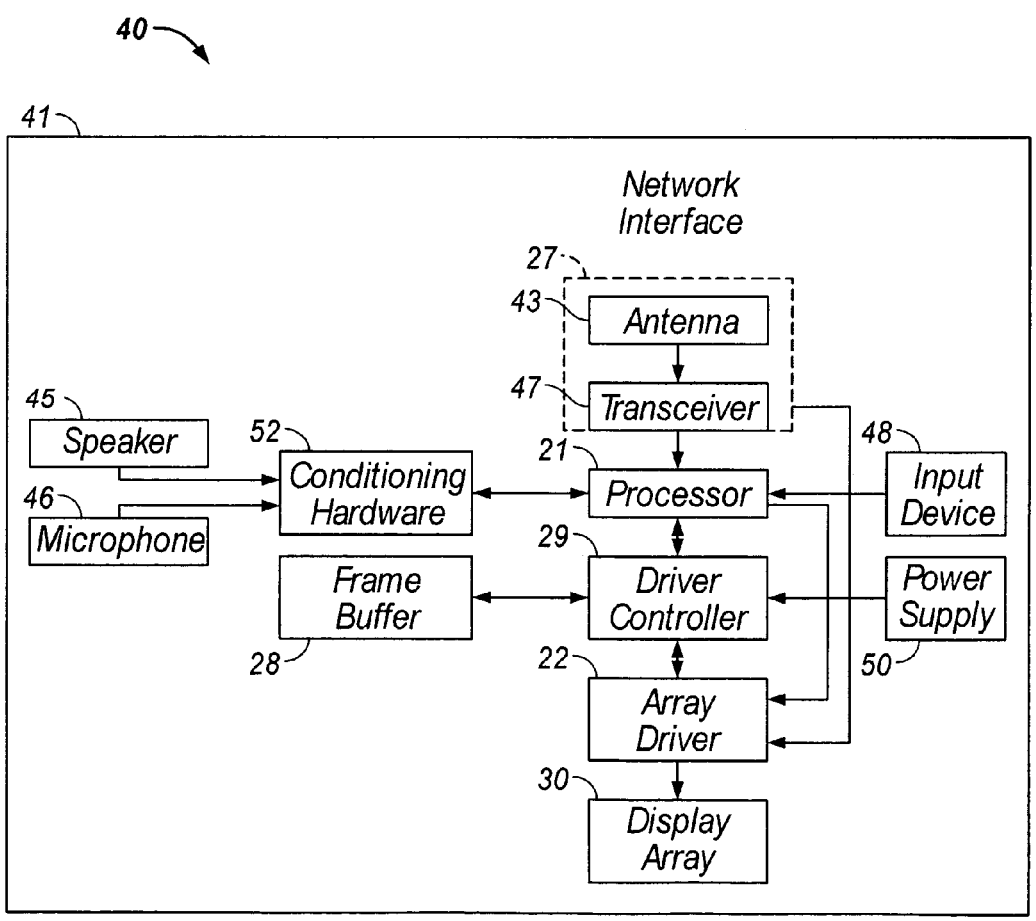

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
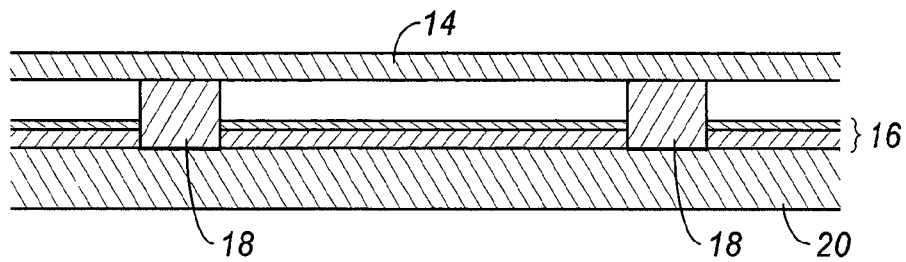
FIG. 7A is a cross section of the device of FIG. 1.
Figure 7B:
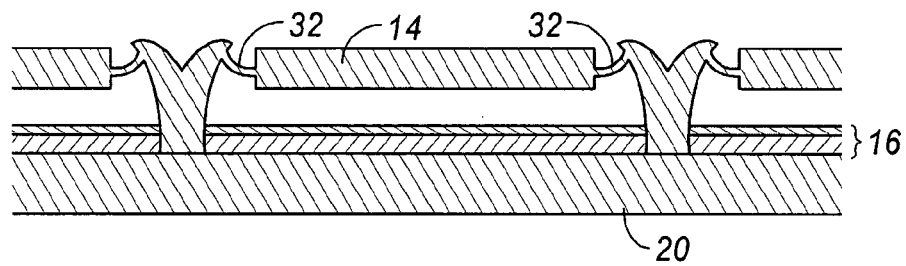
FIG. 7B is a cross section of an alternative embodiment of an interferometric modulator.
Figure 7C:
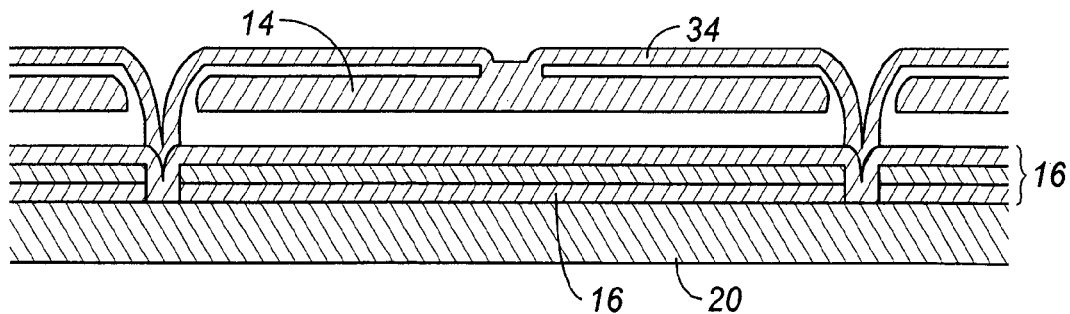
FIG. 7C is a cross section of another alternative embodiment of an interferometric modulator.
Figure 7D:
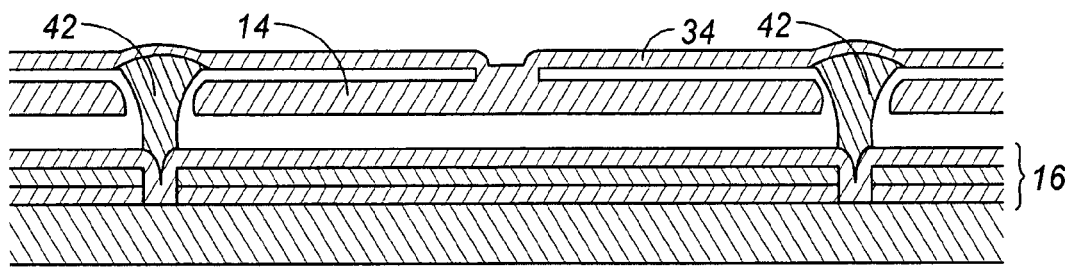
FIG. 7D is a cross section of yet another alternative embodiment of an interferometric modulator.
Figure 7E:
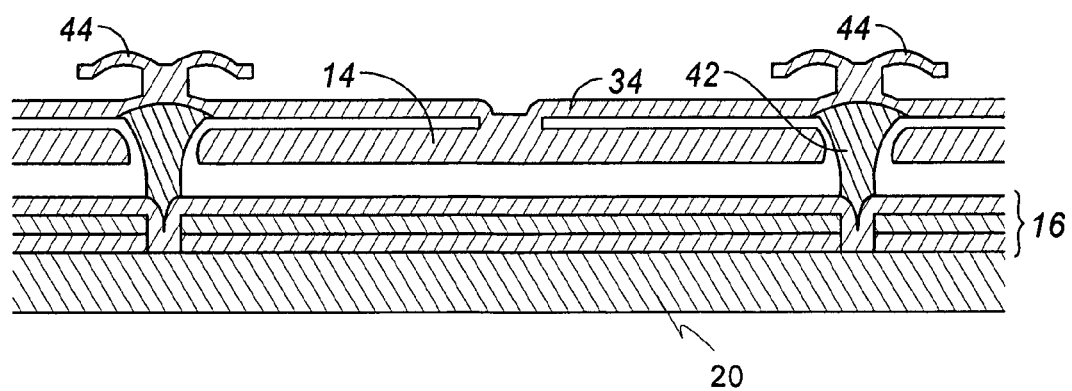
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

In one embodiment, the driver controller 29 provides data for driving the array 30 to the array driver 22 at a specified "refresh rate," which may be dependent on characteristics of the display array 30 being addressed. For example, STN displays are refreshed typically at 70 Hz or higher irrespective of the content update rate. In this case, the driver controller 29 writes the contents of the frame buffer to the individual pixels of the display to form a viewable image 70 times each second.

Generally, this refresh rate is faster than the rate at which new content is received from the processor 21. The refresh rate of such a system is typically a compromise between a number of factors. For example, displays such as cathode ray tubes (CRT) or non-TFT-based liquid crystal displays (LCD) typically do not have any type of pixel memory. Each pixel of the display can correctly display data written to it for only a brief period of time. In a CRT, this period is typically dependent on the properties of phosphors making up the pixel and the sensitivity of the human visual system to flickering images. In a TFT-LCD, this period is typically dependent upon image relaxation due to migration of ionic impurities in the liquid crystal material. In an STN-LCD, the display refresh rate is typically greater than Hz70 Hz irrespective of the content update rate to maintain acceptable image quality. In a CRT, the display refresh rate is typically equal to or greater than 60 Hz In a bi-stable display device, such as interferometric modulators 12, such periodic refreshing to maintain the current display state may not be necessary. However, even for bistable displays, the display refresh rate may be selected to be faster than the maximum anticipated content update rate. For example, consider a mobile phone device where 90% of the time, the display content is that of a clock or timer changing at 1 Hz and 10% of the time the display is used to present video at 30 Hz. Unless a means of communicating the anticipated content update rate to the driver controller 29 is included, the driver controller 29 generally refreshes the display continuously at the video rate of 30 Hz. This results in unnecessary power dissipation for 90% of the time as the display is refreshed at 30 Hz instead of 1 Hz. In some applications, for example, when the system is run on battery power, power considerations can be important. Generally, the higher the refresh rate, the more power that is consumed by the display and the controller. In one embodiment, the driver controller 29 reduces power consumption by providing a display refresh rate that varies with the content update rate. In particular, in one embodiment, the display array 30 includes interferometric modulators 12 that maintain display state, and thus the output of the display, so long as a bias voltage is applied to the interferometric elements. Thus, such a display array 30 does not need to be periodically refreshed to maintain the displayed image. Embodiments can desirably leverage this property to provide electronic devices having lower power consumption by decreasing the refresh rate under selected conditions.

Figure 8:
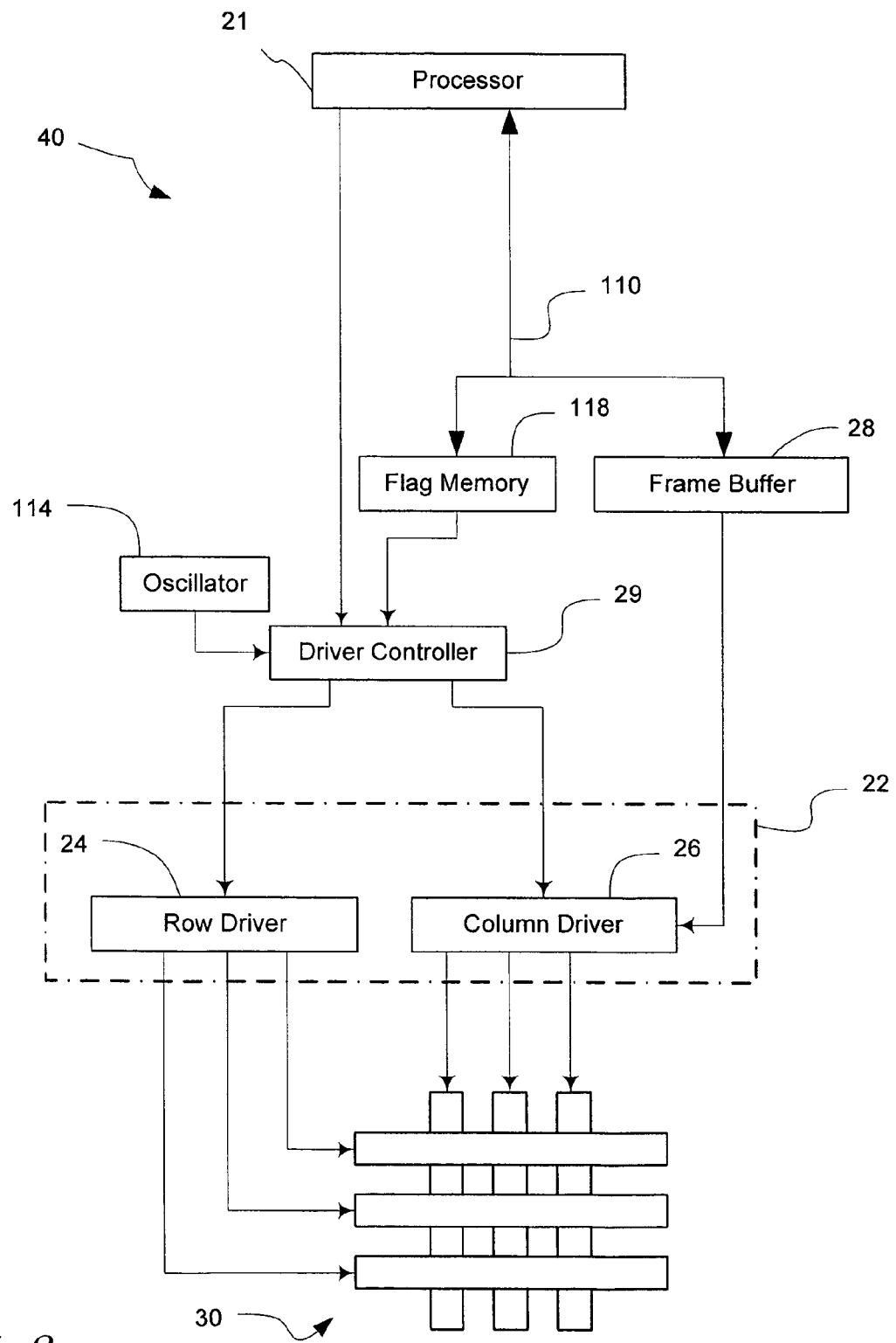
FIG. 8 is a block diagram illustrating an exemplary driver controller that controls an interferometric display.

FIG. 8 is a block diagram illustrating aspects of the electronic device 40 of FIG. 6*b*. In particular, in one embodiment, a driver controller 29 is configured to periodically update a display via the array driver 22. In one such embodiment, the driver controller 29 is configured to only update the display if the frame buffer 28 has received data from the processor 21 subsequent to the last update or refresh of the display. In one embodiment, a flag memory 118 indicates to the driver controller 29 whether the frame buffer 28 has received data subsequent to the last update.

In the exemplary device 40, the processor 21 is electrically connected to the frame buffer 28 via a bus 110. The bus 110 may be any suitable type of data bus capable of communicating image data from the processor 21 to the frame buffer 28. In one embodiment, the bus 110 includes a group of address lines that identify one or more addresses within the frame buffer 28 and a group of data lines over which image data is written to the identified address. In one embodiment, a single set of lines is time multiplexed between identifying an address and providing data to be written to that address. In one embodiment, the bus 110 includes a write enable line that determines whether an access to the frame buffer is a write or a read. A flag memory 118 is connected to the bus and configured to be set to a particular state when the frame buffer 28 receives data over the bus 110.

In operation, the processor 21 writes new display data to the frame buffer 28 at a rate defined as the content update rate. The display controller 29 polls the state of the flag memory 118 at a polling rate that can be faster than, essentially equal to, or slower than the maximum refresh rate of the display controller 29 or the display array 30. In one embodiment, the display controller 29 polls by reading data from the flag memory 118 and comparing that data to a first state that indicates whether new data has been written to the frame buffer 28. In one embodiment, the display controller 29 performs one read/compare of the flag memory for each polling event. In another embodiment, at each polling event, the display controller 29 performs multiple read/compare operations based on the flag memory 118, for example, by repeating a loop for a predetermined time or predetermined number of read/compare operations. In one embodiment, the display controller 29 may poll after writing a frame of data. In one embodiment, the display controller 29 may perform the read/compare operations at a predetermined rate, such as 100 Hz, until the frame buffer 29 receives data. In one embodiment, the controller 29 repeatedly performs the read/compare operations at a rate dependent upon availability of the display controller 29 until the flag memory 118 indicates that data has been received. In yet another embodiment, the flag memory 118 or frame buffer 28 may be configured to generate an interrupt of the display controller 29 when new data is received.

In one embodiment, a timing circuit or oscillator 114 provides a timing signal to a driver controller 29. The timing signal, in concert with circuitry or software within the driver controller 29, establishes the polling rate of the driver controller 29. At intervals defined by the polling rate, and gated by the flag memory 118, the driver controller 29 reads data from the frame buffer 28 and writes the data to the corresponding row and pixel of the display array 30 via an output circuit such as the array driver 22. In one embodiment, the driver controller 29 defers updating the display until the next polling period if the frame buffer 28 has not received data since the last update of the display. In one embodiment, the driver controller 29 is configured to receive polling rate information from the processor 21 and configure its internal circuitry or software to function with the oscillator 114 accordingly. In another embodiment, the driver controller 29 can operate using a fixed polling rate. In one embodiment, the polling rate of the driver controller 29 is set by an operating system of the processor 21. In one such embodiment, the polling rate is provided to the operating system by an application program.

In one embodiment, the flag memory 118 is connected to the bus 110. In another embodiment, the frame buffer includes the flag memory 118. In yet another embodiment, the flag memory 118 is provided in separate, discrete components. The flag register 118 may include a memory circuit or one or more registers configured to store a data value. In one embodiment, when data is communicated over the bus 110 to the frame buffer 28, the data value of the flag memory 118 is set to an indicative value whenever the write enable line of the bus is set to enable writes. In another embodiment, the flag memory 118 is set in response to the address or data signals themselves. In yet another embodiment, the flag memory 118 is set by a circuit in the frame buffer 28. The flag memory 118 can be configured to be set to a first such indicative value, e.g. 1, that indicates that data has been written to the frame buffer 28, or a second indicative value, e.g., 0, that indicates that no data has been written to the frame buffer 28 subsequent to the last resetting of the flag memory to the second indicative value. Typically, this resetting of the flag memory to the second indicative value will be coincident with an update of the display array 30. In one embodiment, the flag memory 118 is configured to store a set of values. For example, in one embodiment, the flag memory 118 includes sufficient storage capacity to store one indicative value for a set of rows or columns. In one embodiment, the flag memory 118 includes sufficient storage capacity to store one indicative value for each row or column. In one embodiment, the flag memory 118 includes address decoding circuitry that receives the address of data off the bus when a write is enabled and sets the value of a corresponding location in the flag memory 118 to indicate that a particular portion of the frame buffer corresponding to the address information has been updated.

In one embodiment, the driver controller 29 is configured to poll the flag memory 118 for an update at a frequency that is higher than the maximum anticipated content update rate. If the driver controller 29 reads the first indicative value from the flag memory 118, i.e., the frame buffer 28 has been updated, the driver controller 29 writes the second indicative value, e.g., 0, to the register 118, then starts the refresh cycle by writing the contents of the frame buffer 28 to the display array 30. At the end of the update, the driver controller 29 again begins polling the flag memory 118 at a predetermined frequency. If during its polling the driver controller 29 reads the second value from the register 118, the driver controller 29 does not refresh the display array 30 from the frame buffer 28. This enables dynamic adjustment of the display refresh rate based on the content update rate.

In one embodiment, the flag memory 118 can include an array of values, each corresponding to a set of rows in the frame buffer 28. When any of the set of rows is updated, the corresponding array value is set to the first value, e.g., 1. In such an embodiment, the driver controller 29 checks the array of elements at a periodic rate. In one embodiment, the driver controller 29 checks the array of elements according to the scan order of rows of the display array 30. If one of the rows has been updated, i.e., the corresponding array element contains the first value, the driver controller 29 resets the array element value and proceeds with the update of the corresponding rows of the display. If none of the rows corresponding to an array element value has been updated, the driver controller 29 skips the update to those rows.

It is to be recognized that other embodiments can include different levels of granularity with a corresponding increase or decrease in the size of the array of values in the flag memory 118. In one embodiment, the array of values in the flag memory 118 corresponds to a set of columns. In other embodiments, the set of rows or columns includes only a single row or column, i.e., an array element is provided by the flag memory 118 for each row or column in the frame buffer. In yet another embodiment, the flag memory 118 includes an array element for each pixel in the display.

In one embodiment, the frame buffer 28 includes memory for storing the contents of the entire display array 30. In another embodiment, the frame buffer 28 receives block updates for the display and provides memory for storing just the block updates to the display and not the entire display. The memory to store the updates can be in the form of a queue, a ring buffer, or any other suitable buffer data structure such as are known in the art.

Figure 9:
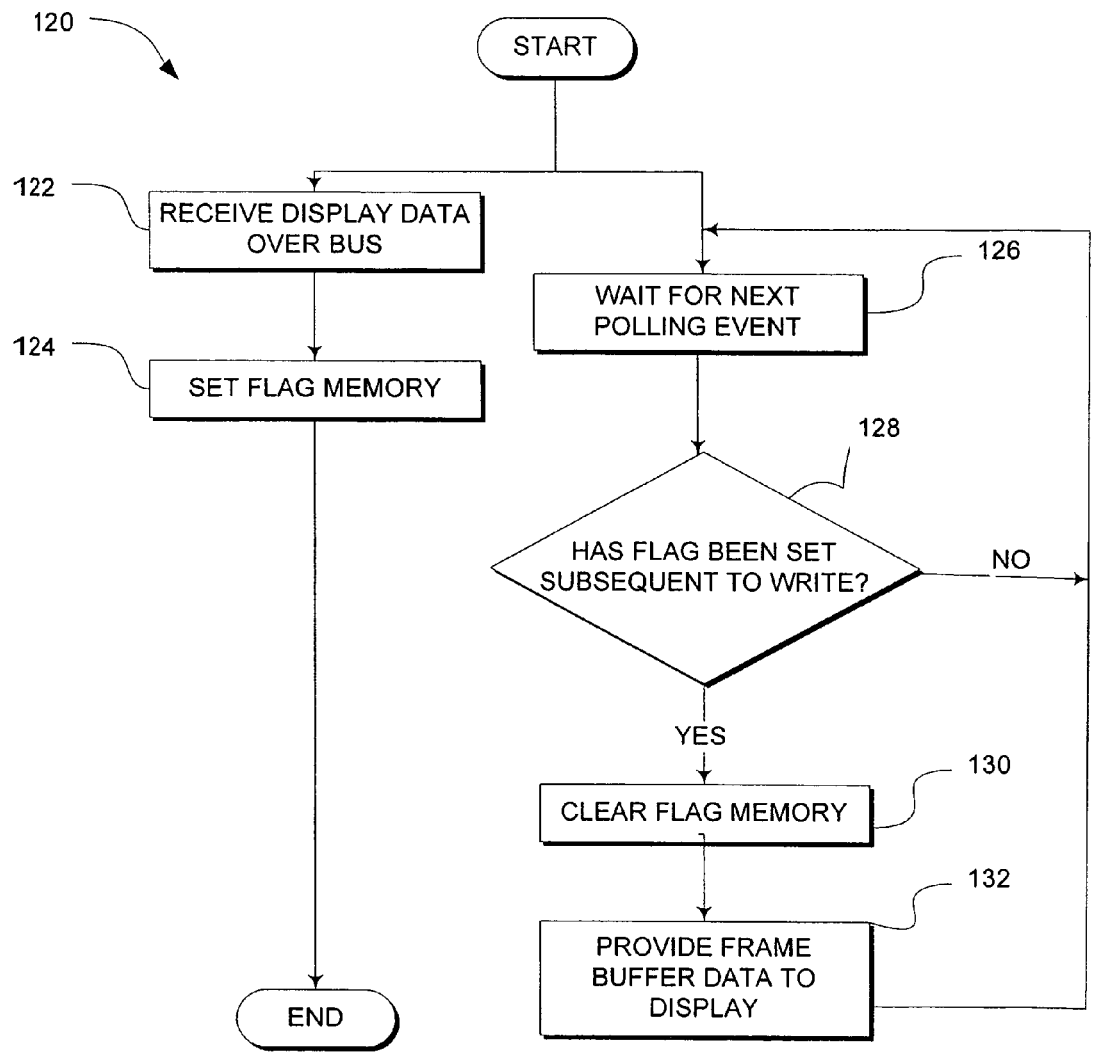
FIG. 9 is a flowchart illustrating an exemplary method of controlling a display with the exemplary driver controller of FIG. 8.

FIG. 9 is a flowchart illustrating an exemplary method 120 of controlling the display array 30 with the exemplary driver controller 29 of FIG. 8. Depending on the embodiment, the acts or events of any methods described herein may be performed in any sequence, may be added, merged, or left out all together (e.g., not all acts or events are necessary for the practice of the method), unless the text specifically and clearly states otherwise. Moreover, unless clearly stated otherwise, such acts or events may be performed concurrently or in parallel rather than sequentially. The method 120 includes substantially concurrent or parallel flows which begin at blocks 122 and 126. Beginning at the block 122, the processor 21 provides data over the bus 110 to the frame buffer 28. Proceeding to block 124, the flag memory 118 is updated to reflect that data has been written to the frame buffer 828 subsequent to the last reset of the flag memory 118, which in the process 120 would have been coincident with the last update of the display array 30. In one embodiment, the flag memory 118 is updated when the write enable line of the bus 110 is set.

Moving to the block 126, the driver controller 29 waits for the next polling event (which may be at the start of the next display cycle). In one embodiment, the polling event includes a signal generated by the combined action of oscillator 114 and the associated software or hardware within display controller 29. This polling event signal stimulates the driver controller 29 to check the flag memory 118. Next at a a block 128, the driver controller 29 determines whether the flag memory 118 has been set to a first state indicating that new data has been written to the frame buffer subsequent to the last update of the display array 30. If the flag memory 118 indicates that no new data has been written to the display, the method 120 returns to the block 126 and waits for the next display time. If the flag memory 118 indicates that new data has been written to the display subsequent to the last display update, the method 120 proceeds to a block 130 in which the driver controller 29 clears (e.g., sets the memory to a second state that indicates that data has not been received since the last update) the flag memory 130. Next at block 132, the driver controller 29 provides the frame buffer data to the display 30 via the array driver 22.

Thus, the display array 30 is desirably updated at a rate that is dependent upon the content of the display data, e.g., the frequency of change of that content, and not merely at a fixed rate that is set by the maximum anticipated content update rate. This greatly reduces the power consumption of the display panel and the controller.

In one embodiment, a lower or higher display polling rate can be set by software running on the processor. This is communicated to the driver controller 29 via the MPU interface. Commonly used MPU interface standards may be used to support communication between the MPU and the driver controller 29. For example, video player software can set the display polling rate higher when playing video, then return the display polling rate to its previous setting when complete. Game software can vary the display polling rate depending on the state of the game. Thus, the display polling rate can be varied to minimize power consumption. In such embodiments, the software can be aware that the display can have its polling rate varied in this manner. In one embodiment, an operating system in the electronic device connected to the display array 30 provides an application programming interface (API) for setting the polling rate. In one embodiment having the API, the polling rate for a selection portion of the display array 30 can be set to a value that is different from the polling rate of other portions of the display. In other embodiments, the operating system of the processor 21 can set a polling rate based on the type of software running, operating system services that the software uses, or other heuristic data to select a polling rate. In one embodiment, a software module can be configured to monitor updates to the display data and adaptively select a display rate based on the frequency of updates. Thus, the polling rate can be desirably matched to the rate of change of the display data and due to the nature of the interferometric display, e.g., the ability to maintain a bi-stable state with application of a low voltage, it is possible to maintain the image without need for frequent refreshing of the display to maintain an unchanged image.

Typically, a driver controller 29 operates in conformance with industry defined standards so that the processor can be used with a variety of different display technologies such as LCD from different manufacturers. Redesign of a processor and the controller MPU interface to a new display interface is typically a resource intensive, and expensive, change. The use of a flag memory 118 enables the use of a standard MPU interface between the processor 21 and the frame buffer 28 without any modifications to the processor. Thus, in one embodiment, the bus 110 conforms to a specified interface standard, such as an industry standard. In another embodiment, the bus 110 is configured to permit the driver controller 29 and the display array 30 to emulate the display interface of LCD displays. Thus, an existing interferometric or other bi-stable display can be fabricated using the driver controller 29 and the display array 30 without needing to change the design of other system components such as the processor 21. The use of the method 120 by the driver controller 29 can thus also be transparent to the processor 21 and software executed by the processor 21 so that no changes need be made to the processor 21 or software executing on the processor 21 in order to support the varying polling rate.

Figure 10:
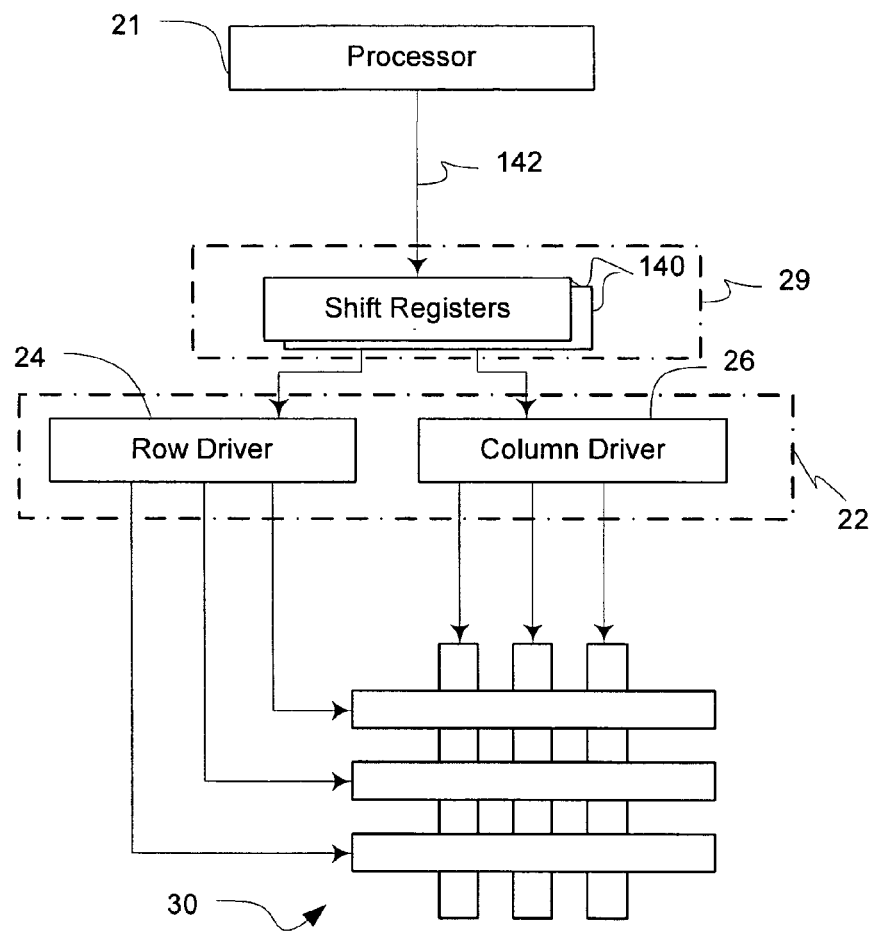
FIG. 10 is a block diagram illustrating another exemplary driver controller that controls an interferometric display.

FIG. 10 is a block diagram illustrating another exemplary driver controller 29 that controls a display array 30. In the illustrated embodiment, the driver controller 29 includes one or more memories or shift registers 140 that are connected to the processor 21 via a bus 142. In one embodiment, the bus 142 is a serial interface such as a serial peripheral interface (SPI) bus. The shift registers 140 are operably connected to the array driver 22. Since this exemplary driver controller 29 does not use a frame buffer, its operation may be more immediate (has a reduced latency between when the processor 21 writes the image data and the time the image data is displayed) than that of the systems in the embodiments discussed above. The display controller 29 of FIG. 10 thus updates the data only in response to receiving data without a set polling or refresh rate.

In one embodiment, the processor 21 serially writes image data to a shift register 140 corresponding to a portion of the display array 30, for example, a shift register 140 may represent only the memory required for a single row of the display array 30. In one embodiment, the processor 21 provides the data asynchronously over the bus 142. For example, the processor 21 may provide the image data to the shift register 140 as the processor 21 generates the image data. When the shift register 140 fills, the shift register 140 outputs the display data to the display array 30 via the array driver 22, which strobes the corresponding row or rows while converting the image data to column voltage signals.

Figure 11:
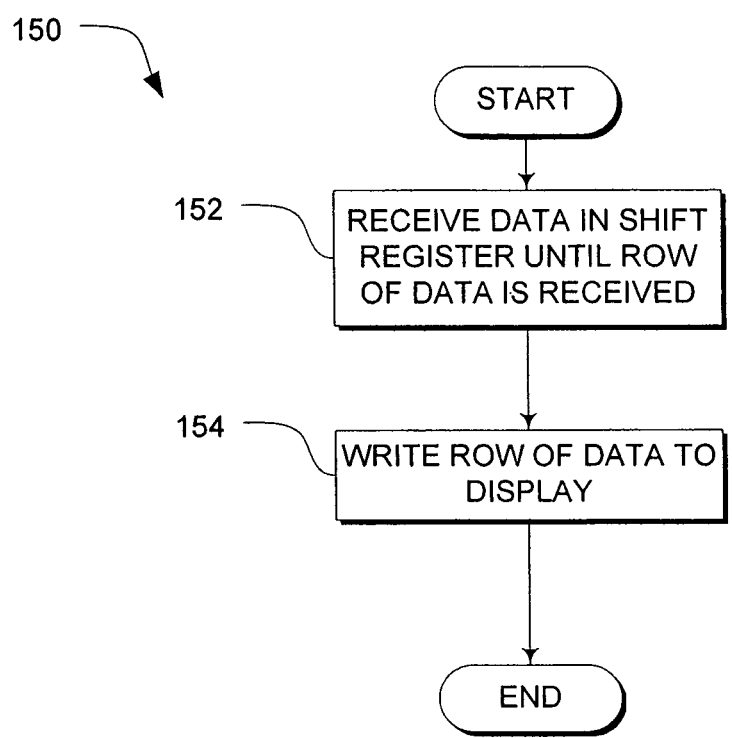
FIG. 11 is a flowchart illustrating an exemplary method of controlling a display using the exemplary driver controller of FIG. 10.

FIG. 11 is a flowchart illustrating an exemplary method 150 of controlling the display array 30 using the exemplary driver controller 29 of FIG. 10. The method 150 begins at a block 152 in which the processor 21 provides image data over the bus 140 to one or more of the shift registers 140. The shift registers 140 receive such data until the shift register is filled, for example, when a row of data is received. Next at block 154, the filled shift registers 140 provide data to the array driver 22. In one embodiment, the array driver 22 generates a strobe for a row in the display array 30 corresponding to the image data in the shift register 140. In one such embodiment, the column driver 26 includes circuitry for receiving the data from the shift register in parallel and converting that data to column drive voltages for the display array 30.

In view of the above, one will appreciate that embodiments of the invention overcome many of the problems in the art by providing a driver controller that dynamically adjusts the display refresh rate to match the content update rate and consuming lower power when static images and video is being displayed.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of updating an image displayed on a display device, the method comprising:
   asynchronously storing image data at a memory;
   setting an indicator to a first state that indicates that said image data has been received subsequent to a previous update of the display device;
   periodically polling the indicator according to a predetermined polling frequency to determine whether the indicator is set to the first state;
   in response to the periodic polling determining that the indicator is set to the first state, providing the received image data from the memory to the display device to update at least a portion of said display device to display the image by writing at least a portion of the image data to the portion of the display device, wherein the image data is not written to the portion of the display device unless the indicator is in the first state; and
   altering the predetermined polling frequency based, at least in part, on a rate at which the image data is asynchronously stored at the memory.

2. The method of claim 1, wherein updating at least a portion of said display comprises setting said indicator to a second state.

3. The method of claim 1, wherein setting the state of said indicator comprises storing a value to the memory.

4. A device for driving a display device, the device comprising:
   a frame buffer configured to asynchronously receive data indicative of an image;
   an output circuit configured to generate a signal for updating the display device to display the image, said updating including asynchronously writing, in response to receiving the data, at least a portion of the data indicative of the image from the frame buffer to the display device;
   a memory operably connected to the frame buffer and configured to indicate that said frame buffer has received data subsequent to updating said display device;
   a controller configured to periodically poll the memory based on a predetermined polling frequency to determine whether the memory indicates that said frame buffer has received the data subsequent to updating said display device and to control said output circuit to defer generating said signal until said memory indicates that said frame buffer has received the data subsequent to updating; and
   a processor configured to alter the predetermined polling frequency based, at least in part, on a rate at which the data indicative of the image is asynchronously received at the frame buffer,
   wherein the data indicative of the image is not written to said display device while said controller defers generating said signal.

5. The device of claim 4, wherein the controller is configured to determine, whether at least a portion of the memory indicates that said frame buffer has received data subsequent to updating of said display.

6. The device of claim 4, further comprising:
   a processor configured to provide the data indicative of the image to the frame buffer.

7. The device of claim 4, wherein the display device comprises a plurality of display elements arranged in a plurality of lines, and wherein the content of the memory indicates whether the driver has updated each of the plurality of lines of the display device to display a corresponding portion of the image.

8. The device of claim 7, wherein the lines comprise rows.

9. The device of claim 7, wherein the lines comprise columns.

10. The device of claim 7, wherein the controller is configured to control whether the driver generates a strobe signal for each of the lines based on the content of the memory.

11. The device of claim 4, wherein the frame buffer is configured to receive the data over a bus, and wherein the memory is operably connected to the bus.

12. The device of claim 11, wherein the content of the memory is updated in response to receiving a write signal over the bus.

13. The device of claim 4, wherein the content of the memory is changed in response to the output circuit generating the signal.

14. The device of claim 13, wherein the controller changes the content of the memory.

15. The device of claim 13, wherein the output circuit is operably connected to the memory and configured to change the content of the memory.

16. An electronic device, the device comprising:
a display device;
a frame buffer configured to asynchronously receive image data;
a driver circuit configured to generate a signal for writing to said display device to display said image data;
a memory operably connected to the frame buffer and configured to indicate that said frame buffer has received data subsequent to information being written to said display, the memory configured to be periodically polled according to a predetermined polling frequency to determine whether the memory indicates that said frame buffer has received data subsequent to information being written;
a processor configured to alter the predetermined polling frequency based, at least in part, on a rate at which the image data is asynchronously stored at the frame buffer,
wherein said driver circuit is configured to generate said signal only in response to said periodic polling determining that the memory indicates that said frame buffer has received data subsequent to information being written to said display; and
in response to the signal, providing the received image data from the frame buffer to the display.

17. The electronic device of claim 16, further comprising:
a processor that is in electrical communication with said display, said processor being configured to process the image data;
a memory device in electrical communication with said processor.

18. The electronic device of claim 16, further comprising:
an image source module configured to send said image data to said processor.

19. The electronic device of claim 18, wherein said image source module comprises at least one of a receiver, transceiver, and transmitter.

20. The electronic device of claim 19, further comprising:
an input device configured to receive input data and to communicate said input data to said processor.

21. A device for driving a display device, the device comprising:
means for asynchronously receiving and storing data indicative of an image;
means for generating a signal for updating the display device to display said image, said updating including asynchronously writing, in response to receiving the signal at least a portion of the stored data to the display device;
means for setting an indicator indicating that said means for receiving and storing has received data subsequent to updating of said display device;
means for periodically polling said indicator according to a predetermined periodic polling frequency to determine whether the indicator is set;
means for controlling said means for generating to defer generating said signal until said polling determines that the indicator is set to indicate that said means for receiving and storing has received data subsequent to updating; and
means for altering the predetermined polling frequency based, at least in part, on a rate at which the data indicative of the image is asynchronously received,
wherein the data indicative of the image is not written to said display device while said controlling means defers generating said signal.

22. The device of claim 21, wherein the display device comprises a plurality of display elements arranged in a plurality of lines, and wherein the indicator indicates whether the means for generating has updated each of the plurality of lines of the display device to display a corresponding portion of the image.

23. A device for driving a display device, the device comprising:
a shift register configured to asynchronously receive data indicative of a portion of an image, the shift register having only enough memory to store data for said portion, wherein the shift register is further configured to generate an indication signal indicating that the shift register has been filled with the received data, the indication signal configured to be periodically polled based on a predetermined polling frequency to determine whether the indication signal indicates that the shift register has been filled;
a processor configured to provide the data to the shift register; and
an output circuit configured to update a display device to display the portion of the image,
wherein the shift register is configured to provide the received data to the output circuit in response to the periodic polling determining that the indication signal has been generated, and the processor further configured to alter the predetermined polling frequency based, at least in part, on a rate at which the data indicative of the portion of the image is asynchronously received at the shift register.

24. The device of claim 23, further comprising:
a display device in electrical communication with said output circuit; and
a memory device in electrical communication with said processor,
wherein the processor is in electrical communication with said display device, and wherein the processor is configured to serially write the data to the shift register, as the processor generates the data, without the use of a frame buffer.

25. The device of claim 24, further comprising:
a bus, wherein the processor is configured to asynchronously provide the data to the shift register over the bus.

26. The device of claim 25, wherein said bus comprises a serial bus.

27. The device of claim 24, further comprising:
an image source module configured to send said image data to said processor.

28. The device of claim 27, wherein said image source module comprises at least one of a receiver, transceiver, and transmitter.

29. The device of claim 24, further comprising:
an input device configured to receive input data and to communicate said input data to said processor.

30. A device for driving a display device, the device comprising:
means for asynchronously receiving a single line of data indicative of a portion of an image;
means for generating an indication that the single line of data has been received by the means for asynchronously receiving;
means for providing the data to the means for asynchronously receiving;
means for periodically polling said indication according to a predetermined periodic polling frequency to determine whether the indication indicates data has been received;
means for updating the display device to display said portion of the image in response to the polling determining that the indication indicates data has been received; and
means for altering the predetermined polling frequency based, at least in part, on a rate at which single lines of data indicative of portions of the image is asynchronously received,
wherein the means for asynchronously receiving includes means for providing said single line of data to the means for updating upon receiving the single line of data and before receiving another line of data.

31. The device of claim 30, further comprising:
means for storing data in electrical communication with said processing means,
wherein the means for providing includes means for serially writing the data directly to the means for asynchronously receiving as the means for providing generates the data.

32. The device of claim 31, further comprising:
means for communicating data, wherein said means for processing is configured to provide the data to the means for asynchronously receiving over the means for communicating data.

33. The device of claim 23, wherein the shift register has only enough memory to store data for a single row of the display device.

34. The device of claim 33, wherein the output circuit is configured to strobe a row of the display device corresponding to the received data while converting the received data to column voltage signals.

* * * * *